Patented Nov. 18, 1947

2,430,855

UNITED STATES PATENT OFFICE 2,430,855

PURIFICATION OF TARTARIC ACID

William E. Barch, Freeport, N. Y., assignor to Standard Brands Incorporated, New York, N. Y., a corporation of Delaware No Drawing. Application September 1, 1944, Serial No. 552,388

7 Claims. (Cl. 260—536)

The invention relates to a method for the preparation of a tartaric acid. More particularly it pertains to the production of dextro-tartaric acid, and includes correlated improvements and discoveries whereby purification of such acids may be facilitated.

An object of the invention is to provide a method in accordance with which a relatively pure tartaric acid may be produced from a crude acid composition.

Another object of the invention is the provision of a method for refining a crude tartaric acid.

A further object of the invention is to provide a method for preparation of pure dextro-tartaric acid from a crude acid obtained by direct crystallization of an oxidation liquor which may be conducted in a ready, efficient and economical manner.

A more particular object of the invention is a provision of a method whereby a tartaric acid may be freed from substantially all oxalic acid in a single recrystallization.

A specific object of the invention is to provide a method in accordance with which synthetic dextro-tartaric acid may be separated from accompanying oxalic acid in a form that is substantially free from ash and from oxalic acid.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention pure and ash-free tartaric acids may be prepared in a single crystallization operation, from insoluble salts thereof by reacting such a salt with an acid stronger than the tartaric acid, and which stronger acid forms an insoluble salt with the metal component of the salt of the tartaric acid, thereafter separating formed insoluble salt from the liquid or mother liquor, and then adding oxalic acid to the liquid so obtained prior to crystallization of the tartaric acid, the oxalic acid being added in an amount insufficient, preferably just insufficient, to crystallize out following evaporation of the solution to produce a crystal crop of the tartaric acid. The insoluble oxalate which has precipitated may be removed from the solution, as by filtering or centrifuging, and the solution or filtrate concentrated, for example, by evaporation under vacuum, with obtention of crystallized tartaric acid from the concentrated solution.

More especially, the procedure is applicable to the preparation of a pure tartaric acid, specifically dextro-tartaric acid.

By way of illustration, and referring to dextro-tartaric acid as typical, the procedure may be utilized in the following manner to produce a pure tartaric acid.

A crude acid obtained by crystallization of an oxidation liquor and containing dextro-tartaric acid and oxalic acid may be dissolved in an amount of water which is sufficient to produce a saturated solution of the tartaric acid. Solution occasions a lowering of temperature with attending separation of oxalic acid, and following stirring, the separated oxalic acid may be removed by centrifuging, with the formed cake being washed with a small amount of water.

The filtrate or mother liquor may now be treated with an alkali earth metal compound capable of reacting with oxalic acid to produce an insoluble oxalate, as the oxides, hydroxides, and carbonates of calcium, strontium and barium, and in an amount sufficient to reduce the oxalic acid content to a value such that the ratio thereof to the tartaric acid is not more than 2.5 to 100. The reaction mixture may be stirred, brought to a temperature of about 80° C., and the insoluble salt, for example calcium oxalate, removed.

There is thus obtained a filtrate or mother liquor which is then concentrated by evaporation in a vacuum to a point at which a crystal crop of the tartaric acid is obtained. This may be in the form of a desired slurry. The tartaric acid thus obtained is of a high purity and is substantially free from ash and from oxalic acid. Hence the method entails an addition of oxalic acid to a solution of a tartaric acid prior to its crystallization, with the oxalic acid being present in an amount insufficient to crystallize out following evaporation to produce a crystal crop of the tartaric acid.

Somewhat more particularly, oxalic acid may be added to a solution of a tartaric acid containing also an alkali earth metal constituent. The addition is accomplished prior to crystallization of tartaric acid, and the oxalic acid is present in an amount sufficient substantially to remove the alkali earth metal present, but insufficient to crystallize out when the solution is evaporated for the production of crystallized tartaric acid.

Another feature of the invention resides in the addition of an alkali earth metal compound capable of reacting with oxalic acid to produce an insoluble oxalate to a solution containing oxalic acid and another organic acid with the alkali earth metal compound being present in an amount which reduces the oxalic acid content to a value such that it will not crystallize out following evaporation for the production of the crystallized tartaric acid. An alkali earth metal oxalate thus forms and precipitates, and following its removal the tartaric acid is crystallized.

As an illustrative embodiment of a manner in which the invention may be practiced, the following description is presented.

A crude dextro-tartaric acid, such as may be obtained by crystallization of an oxidation liquor at room temperature and containing tartaric acid and oxalic acid in substantially the ratio of 100 to 15 and having these acids in the approximate amounts of 444 grams and 67 grams, respectively, may be dissolved in water, about 350 cc., at about 10° C. to yield a saturated solution with respect to the tartaric acid.

Inasmuch as solution of the acid composition is attended by the absorption of heat, the temperature is reduced or lowered to about 2° C. Hence refrigeration is not required. This mixture may be well stirred and the oxalic acid which separates out in crystalline form may be removed by centrifuging and the cake washed with a little water. This leads to the recovery of about 45 grams of oxalic acid, which is about 67% of the amount present.

The filtrate or mother liquor obtained has a tartaric and oxalic acid content in the ratio of about 100 to 5, and to this there may be added calcium hydroxide, e. g., slaked lime suitably as a slurry containing 6.5 grams in 100 cc. of water, the slaked lime being present in an amount sufficient to reduce the ratio of tartaric acid to oxalic acid to about 100 to 2.5. The solution is then brought to a temperature of about 80° C. with stirring, and the calcium oxalate formed and precipitated may be removed by passage through a continuous type of centrifuge.

The solution thus obtained and containing only a small amount of oxalic acid may now be evaporated under vacuum to such a concentration as will lead to the crystallization of a considerable amount of the tartaric acid present. This crystal product is practically free from oxalic acid and calcium. Further, a convenient concentration has been found to be a ratio of tartaric acid to water of 100 to 34. The crystallized tartaric acid may be recovered in a suitable manner, and the mother liquor may be further treated as by addition of another quantity of slaked lime and following filtration and concentration as above described, or it may be combined with the solution undergoing initial processing.

Thus the quantity of lime or other alkali earth metal compound introduced may be varied but with the restriction that it shall be insufficient to precipitate all of the oxalic acid in the solution.

Tartaric acids, e. g., dextro-tartaric acid, are frequently obtained through the decomposition of their insoluble salts, as their calcium salts, with a stronger acid, as sulfuric acid, which reacts to form an insoluble salt of the metal and the free tartaric acid. However, it is only with difficulty that all of the formed insoluble salt, as calcium sulfate, is fully removed from the tartaric acid.

The method hereinabove described overcomes such difficulty through the addition of oxalic acid in the ratio of about 2.5 parts of oxalic acid to about 100 parts of the tartaric acid. The oxalic acid may be present in a smaller amount, but it should not be present in a greater amount. The introduction of oxalic acid removes the metal constituent, which may be calcium, in the form of an insoluble oxalate, which would be calcium oxalate, and this removal is substantially quantitative.

Such treatment may then be followed by removal of the insoluble salt and concentration of the mother liquor to obtain the crystallized tartaric acid. Moreover, the mother liquor from the tartaric acid crystallization may desirably be further processed through the addition of slaked lime and subsequent concentration, as presented in the foregoing illustration. When calcium hydroxide is employed there is an accompanying prevention of any accumulation of sulfuric acid.

The production of synthetic dextro-tartaric acid presents the problem of refining the crude acid obtained by direct crystallization from the oxidation liquor. The impurity of consequence is oxalic acid. The physical and chemical properties of the two acids are sufficiently different to permit of their quantitative separation. But to do this economically in few operations without loss of either acid, was found to be a rather difficult matter.

Separation by direct fractional crystallization gives a pure oxalic acid up to a ratio composition of mother liquor of about 100 parts tartaric acid, and 6 parts oxalic acid, after which tartaric acid crystallizes to exhaustion of the mother liquor. All tartaric acid fractions obtained contain oxalic acid. This I found to be due to a relatively slight mutual influence of either acid on the solubility of the other, the amounts crystallizing being governed by the amount of water present.

At least two re-crystallizations of tartaric acid are required to reduce the oxalic acid below the point where it may be detected. This is an uneconomical procedure.

Recourse thus was had to a chemical method of separation, particularly to take advantage of the low solubility of insoluble oxalates, especially the alkali earth metal, and specifically calcium oxalate. Such requires only a small amount of raw material, e. g., slaked lime. I have found, however, that addition of the theoretical amount of lime to remove oxalic acid as calcium oxalate from a mixture of 100 parts of tartaric acid and 6 parts of oxalic acid, produced a precipitate containing much calcium tartrate. At the same time both calcium and oxalic acid were retained in solution, and tartaric acid crystals obtained on evaporation have a high ash content beyond U. S. P. specifications. The independent solubilities of the two acids provided a solution of the difficulty. Oxalic acid need not be removed entirely, but only reduced in content sufficiently to remain in solution in the amount of water present after evaporation to a suitable slurry of tartaric acid crystals. The ratio of tartaric acid to oxalic acid allowed to remain in solution should be 100 to not more than 2.5, and tartaric acid thus obtained is substantially ash-free and oxalic acid-free. No calcium remains in solution, and the precipitate removed does not contain calcium tartrate.

Accordingly, and for example, lime may be added to a mother liquor from time to time to keep oxalic acid at that ratio, or somewhat below. The quantity of precipitate is small and may be removed by, e. g., a continuous Sharples type centrifuge. There is produced an ash-free product that is superior to the present commercial product which is obtained from calcium tartrate by reaction with sulfuric acid. By this latter method, dissolved calcium sulfate precipitates continuously during crystallization of the tartaric acid, thereby contaminating the product and forming a coating on the apparatus. This is obviated by maintaining the above-mentioned concentration of oxalic acid in the mother liquor.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for the preparation of a tartaric acid substantially free from oxalic acid and ash forming constituents which comprises adding oxalic acid to a liquid containing a tartaric acid and a minor quantity of an ash forming constituent prior to crystallization of the tartaric acid, the oxalic acid being added in an amount so that during such crystallization it is not greater than about 2.5 parts to about 100 parts of tartaric acid, separating precipitated oxalate, and crystallizing tartaric acid.

2. A method for the preparation of a tartaric acid substantially free from oxalic acid and ash forming constituents which comprises adding oxalic acid to a liquid containing a tartaric acid and a minor quantity of an alkali earth metal prior to crystallization of the tartaric acid, the oxalic acid being added in an amount so that during such crystallization it is not greater than about 2.5 parts to about 100 parts tartaric acid, separating precipitated alkali earth metal oxalate, and crystallizing tartaric acid.

3. A method for the preparation of a tartaric acid substantially free from oxalic acid and ash forming constituents which comprises adding oxalic acid to a liquid containing dextro tartaric acid and a minor quantity of calcium prior to crystallization of the tartaric acid, the oxalic acid being added in an amount so that during such crystallization it is not greater than about 2.5 parts to about 100 parts of tartaric acid, separating precipitated calcium oxalate, and crystallizing tartaric acid.

4. A method for the preparation of a substantially pure tartaric acid, which comprises adding an alkali earth metal compound capable of reacting with oxalic acid to form an insoluble oxalate to a liquid containing oxalic acid and a tartaric acid, said compound being added in such an amount that it reduces the oxalic acid content to a value such that during subsequent crystallization of the tartaric acid it is not greater than about 2.5 parts to about 100 parts of tartaric acid, separating precipitated alkali earth metal oxalate, and crystallizing tartaric acid.

5. A method for the preparation of a substantially pure tartaric acid which comprises dissolving a composition containing dextro tartaric acid and oxalic acid to produce a saturated solution with respect to the tartaric acid with an attendant lowering of temperature whereby oxalic acid crystallizes, removing crystallized oxalic acid from mother liquor, adding a calcium compound to the mother liquor in such an amount that it reduces the oxalic acid content to a value such that during subsequent crystallization of the tartaric acid it is not greater than about 2.5 parts to about 100 parts of tartaric acid, heating, separating precipitated calcium oxalate and crystallizing tartaric acid.

6. In a method for the preparation of a substantially pure tartaric acid the improvement which comprises crystallizing the tartaric acid from a liquid containing oxalic acid in an amount not greater than about 2.5 parts to about 100 parts of tartaric acid.

7. A method for the preparation of a substantially pure tartaric acid the improvement which comprises crystallizing dextro tartaric acid from a liquid containing oxalic acid in an amount not greater than about 2.5 parts to about 100 parts of tartaric acid.

WILLIAM E. BARCH.

REFERENCES CITED

The following references are of record in the file of this patent:

UNITED STATES PATENTS

| Number | Name | Date |
| --- | --- | --- |
| 783,524 | Hooven et al. | Feb. 28, 1905 |
| 1,103,658 | Cantoni et al. | July 14, 1914 |
| 1,278,257 | Tobler | Sept. 10, 1918 |
| 2,257,284 | Stokes et al. | Sept. 30, 1941 |
| 2,204,621 | Rader et al. | June 18, 1940 |
| 2,303,607 | Braun | Dec. 1, 1942 |
| 1,425,605 | Odell | Aug. 15, 1922 |
| 1,945,246 | Witzel | Jan. 30, 1934 |

FOREIGN PATENTS

| Number | Country | Date |
| --- | --- | --- |
| 1,503 | Great Britain | 1905 |
| 108,494 | Great Britain | Sept. 9, 1920 |

OTHER REFERENCES

Thorpe, "Dict. of Applied Chem.," vol. 6 (1926), p. 684.

Gatterman, "Practical Methods of Org. Chem." (3rd ed., 1923), Macmillan Co., pp. 1–11.